E. E. HUFFMAN.
DEPTH INDICATING DEVICE.
APPLICATION FILED JUNE 29, 1920.

1,396,844.

Patented Nov. 15, 1921.

INVENTOR

E. E. Huffman

UNITED STATES PATENT OFFICE.

EDWIN E. HUFFMAN, OF ST. LOUIS, MISSOURI.

DEPTH-INDICATING DEVICE.

1,396,844. Specification of Letters Patent. Patented Nov. 15, 1921.

Application filed June 29, 1920. Serial No. 392,744.

*To all whom it may concern:*

Be it known that I, EDWIN E. HUFFMAN, a citizen of the United States of America, residing at the city of St. Louis, State of Missouri, have invented a certain new and useful Depth-Indicating Device, of which the following is such a full, clear, and exact description as will enable any one skilled in the art to which it appertains to make and use the same, reference being had to the accompanying drawings, forming part of this specification.

My invention relates to a device for indicating at a point either adjacent to or remote from a liquid container, the depth or quantiy of liquid contained therein of the type described in United States reissue Patent No. 14,728 and Patent No. 1,332,341.

In the operation of the prior device referred to, to indicate the gasolene level in automobile tanks, the level of gasolene in the enlargement of the conduit which forms the compensating chamber as described in reissue Patent No. 14,728, slowly rises, probably partly as a result of oxidation of elements of the gasolene and partly on account of solution of air in gasolene. In the course of a few months this rise of level is sometimes sufficient to so restrict the effective volume of the compensating chamber as to impair its operation in compensating for the effects of atmospheric temperature changes. In the prior patents referred to, the removal of the drain plug immediately corrects this condition, but it is the object of this invention to provide means, preferably automatic in operation, to prevent the undue rise of level of gasolene in the compensating chamber without periodically draining same.

Figure 1:
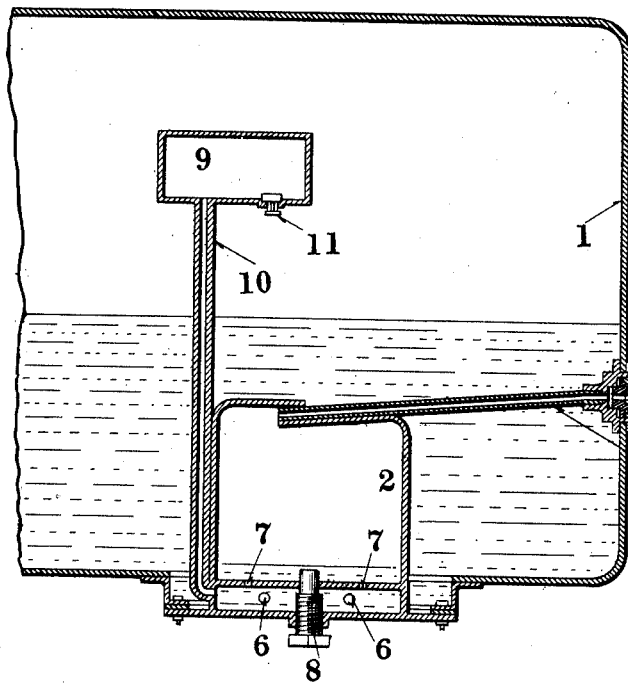
Figure 3:
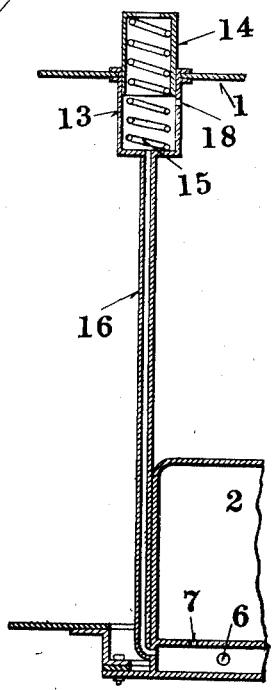
Figure 2:
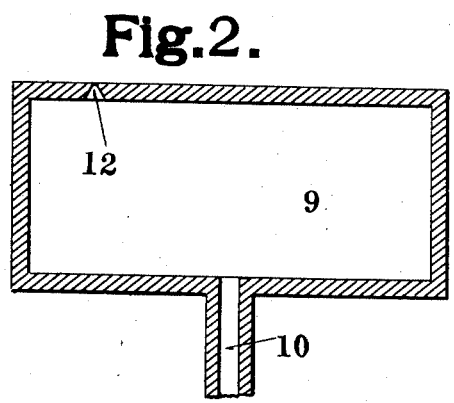

In the accompanying drawings, Figure 1 is a sectional view showing one embodiment of my invention and illustrating the indicating instrument diagrammatically. Fig. 2 is a detail view illustrating a modification of the air restoring means of Fig. 1. Fig. 3 illustrates a further modification.

1 represents a gasolene tank in the bottom of which is located the compensating chamber 2 which is connected by the tube 3 to depth indicating instrument diagrammatically indicated and which comprises the diaphragm 4 and indicator 5. Gasolene from the tank enters the space beneath the compensating chamber through openings 6 and enters the chamber itself through the openings 7 which are made small for the purpose of preventing rapid movement of gasolene into and out of the compensating chamber under the influence of road shocks and the consequent rapid fluctuation of the indicator hand 5. The normal level of gasolene in the compensating chamber is about as indicated in the drawing, varying slightly with the depth of liquid in the tank and consequent compression of the air in the compensating chamber and other parts of the apparatus. 8 is a drain plug, the removal of which not only permits draining of gasolene from the tank, but also from the compensating chamber. The apparatus as thus far described corresponds to the apparatus described in the prior patents hereinbefore mentioned.

To compensate for the slow rise of gasolene level in the compensating chamber, I provide an air chamber 9 positioned at or near middle of the gasolene tank in vertical direction and connected to the chamber beneath the compensating chamber by means of a tube 10 of relative small bore. This air chamber 9 is provided with an opening normally closed by valve 11.

When the temperature in the gasolene tank rises, the air in the chamber 9 expands and as the capacity of this chamber is larger than the capacity of tube 10 a very slight rise in temperature of the air will cause a small quantity of air to be expelled from the lower end of the tube 10 and into the chamber beneath the compensating chamber. This air will of course rise to the upper part of this chamber and will find its way through the openings 7 into the compensating chamber, thus displacing some of the liquid therein and causing it to pass out through said openings. Should the temperature of the air in the chamber 9 fall, additional air will enter the chamber by lifting the valve 11 off its seat and level of gasolene in the tube 10 will rise to the level in the tank, but will be expelled from the tube when the temperature of the air in the chamber 9 again rises. Since the temperature of the air in 9 will frequently change, due to changes in atmospheric temperature and also to the fact that gasolene when supplied to automobile tanks is usually at a different temperature than atmospheric temperature, the apparatus described will automatically operate to frequently supply small quantities of air to the compensating chamber and thus completely overcome the absorption and solution phenomena referred to.

In Fig. 2 is shown a modification of the air chamber in which the valve 11 is omitted and an opening 12 of very small area is provided, the area of this opening being so small that while it permits very slow passage of air, it will not allow the air to escape from the chamber 9 as rapidly as it must escape from this chamber as the result of a change of 10 or 15 degrees in temperature in a few minutes and, therefore, some of the escaping air must pass out through the tube 10.

The supply of air to the compensating chamber also can be conveniently effected manually by means of the small pump shown in Fig. 3 and which comprises a tubular member 13 extending through the top of the tank 1 and connected to the space beneath the compensating chamber by a small bore tube 16. Arranged to slide in 13 is a second tubular member 14 supported by a spring 15 and open at both ends. It will be apparent that by placing a finger over the upper end of 14 and pressing it downward air will be forced through the tube 16. In this modification the tank vent necessary in all gravity or vacuum feed systems may conveniently be made in the member 13 at a suitable point such as 18.

I claim—

1. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means for introducing air into said conduit.

2. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container and temperature responsive means for introducing air into said conduit.

3. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, said conduit being also enlarged at its liquid receiving end, and temperature responsive means for supplying air to said enlarged portion to lower the level of liquid therein.

4. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means for introducing air into said conduit, at a point below level of liquid therein to displace a portion of said liquid.

5. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means forming an air confining chamber connected with said conduit at a point below a level of liquid therein, whereby expansion of air in said chamber will cause a portion of said air to be discharged into the conduit.

6. In an apparatus of the class described, the combination of a liquid container, pressure responsive means for indicating the depth of liquid therein, a pressure transmitting conduit extending from said means to the container and provided with an opening whereby liquid from the container may enter it at a point below level of liquid in said container, and means forming an air confining chamber connected with said conduit at a point below a level of liquid therein, whereby expansion of air in said chamber will cause a portion of said air to be discharged into the conduit, and means permitting entrance of air to said chamber.

7. In an apparatus of the class described, the combination of a liquid container, pressure responsive means for indicating the depth of liquid therein, a pressure transmitting conduit extending from said means to the container and provided with an opening whereby liquid from the container my enter it at a point below level of liquid in said container, means forming an air confining chamber connected with said conduit at a point below a level of liquid therein, whereby expansion of air in said chamber will cause a portion of said air to be discharged into the conduit, and a one way valve for admission of air to said chamber.

In testimony whereof, I have hereunto set my hand and affixed my seal.

EDWIN E. HUFFMAN. [L. S.]